US012620199B2

(12) United States Patent
Arnon et al.

(10) Patent No.: US 12,620,199 B2
(45) Date of Patent: May 5, 2026

(54) ADVANCED IMAGE HASHING FOR ILLEGAL IMAGE DETECTION

(71) Applicant: Dell Products L.P., Round Rock, TX (US)

(72) Inventors: Ohad Arnon, Beit Nir (IL); Adriana Bechara Prado, Niterói (BR)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 18/544,325

(22) Filed: Dec. 18, 2023

(65) Prior Publication Data

US 2025/0200933 A1     Jun. 19, 2025

(51) Int. Cl.
*G06V 10/74* (2022.01)
*G06T 7/174* (2017.01)
*G06V 10/44* (2022.01)

(52) U.S. Cl.
CPC ............ *G06V 10/761* (2022.01); *G06T 7/174* (2017.01); *G06V 10/443* (2022.01)

(58) Field of Classification Search
CPC ...... G06F 18/22; G06F 16/152; G06F 16/137; G06F 16/14; G06F 16/148; G06V 10/761; G06V 10/443; G06V 10/25; G06T 7/174
See application file for complete search history.

(56) References Cited

FOREIGN PATENT DOCUMENTS

WO     WO-2015003606 A1 *   1/2015   ............. G06F 18/22

OTHER PUBLICATIONS

Https://content-blockchain.org/research/testing-different-image-hash-functions/.

* cited by examiner

*Primary Examiner* — Matthew C Bella
*Assistant Examiner* — Janice E. Vaz
(74) *Attorney, Agent, or Firm* — Workman Nydegger

(57) ABSTRACT

One example method includes receiving a digital image, receiving an input list that includes a respective hash for each frame in a group of frames, creating new frames on a particular area of the digital image, and the new frames are created and located based on the information in the input list, obtaining a respective hash for content included within each of the new frames, comparing one of the hashes generated for one of the new frames with a hash from the input list and, when the hashes match, continue the comparing for all frames of the particular area, and when all hashes from the input list have been checked, determining whether or not the digital image is an illegal image.

20 Claims, 4 Drawing Sheets

SOURCE IMAGE

GRAYSCALE IMAGE

GRAY VALUE IMAGE, SIZE 32x32

AFTER DCT BY ROW (NORMALIZED)

AFTER DCT BY COLUMN (NORMALIZED)

UPPER LEFT CORNER (HIGHEST FREQUENCY)

COMPARISON TO MEDIAN

DIFFERENT HASH THAN THE SOURCE IMAGE

| Type of error | aHash | bHash | dHash | mHash | pHash | wHash |
|---|---|---|---|---|---|---|
| Gaussian smoothing | 1828 (20.0%) | 1241 (13.6%) | 3807 (41.6%) | 2122 (23.2%) | 786 (8.6%) | 971 (10.6%) |
| Grayscale | 0 (0%) | 0 (0%) | 0 (0%) | 0 (0%) | 0 (0%) | 0 (0%) |
| Increased brightness | 3874 (42.4%) | 3206 (35.1%) | 5357 (58.6%) | 3451 (37.7%) | 3986 (43.6%) | 2844 (31.1%) |
| Decreased brightness | 1717 (18.8%) | 809 (8.8%) | 4935 (54.0%) | 2115 (37.7%) | 1030 (11.3%) | 1420 (15.5%) |
| JPEG compression | 455 (5.0%) | 598 (6.5%) | 1616 (17.7%) | 658 (7.2%) | 546 (6.0%) | 514 (5.6%) |
| Increased contrast | 2559 (28.0%) | 2062 (22.6%) | 4568 (50.0%) | 2474 (27.1%) | 2460 (26.9%) | 2197 (24.0%) |
| Decreased contrast | 2056 (22.5%) | 766 (8.4%) | 5223 (51.1%) | 2154 (23.6%) | 1063 (11.6%) | 2026 (22.2%) |
| Scaled | 554 (6.1%) | 1297 (14.2%) | 2091 (22.9%) | 851 (9.3%) | 664 (7.3%) | 614 (6.7%) |
| Watermark | 3600 (39.4%) | 5046 (55.2%) | 7167 (78.4%) | 4029 (44.1%) | 4242 (46.4%) | 2896 (31.7%) |
| Cropped | 8543 (93.4%) | 8709 (95.7%) | 9075 (99.2%) | 8514 (93.1%) | 9088 (99.4%) | 7840 (85.7%) |
| Total | 25,186 (25.0%) | 23,775 (23.6%) | 43,839 (43.6%) | 26,368 (26.2%) | 23,865 (23.7%) | 21,322 (21.2%) |

300

402a   402

404

404a y x 406   406a

500

502   554   504

IMAGE

ORG.

PHASE 1

552

LIST

IMAGE
(W. FRAMES)

SERVICE PROVIDER

PHASE 2

550

RESULTS

556

ADVANCED IMAGE HASHING FOR ILLEGAL IMAGE DETECTION

FIELD OF THE INVENTION

Embodiments of the present invention generally relate to image analysis. More particularly, at least some embodiments of the invention relate to systems, hardware, software, computer-readable media, and methods, for analyzing images to determine whether or not the images are illegal.

BACKGROUND

Illegal content and especially the phenomenon of child abuse images is growing at a very high rate. According to the IWF (Internet Watch Foundation) annual report, the total number of category A images in 2022 was twice the amount in 2020. Such increase was partly due to criminal sites selling videos and images of such abuse and, therefore, it has become a problem that concerns most countries of the world.

More and more countries are defining regulations that require service providers, such as ISPs (internet service providers) to identify illegal content, block it, and report it to the authorities. Examples are the EU Digital Services Act and UK Online Safety Bill. The advent of such regulations introduced an "explicit duty" for firms to design websites and services in a way that mitigates against the possibility that their platform will host illegal activity or content.

In order to comply with so many regulations, the service providers need to be able to identify illegal content with high accuracy. This is a huge challenge, since technology that would provide such capabilities must also comply with various data privacy regulations that prevent data analyses unless the data owner allows the service provider to do so.

In more detail, aiming at identifying and reporting child abuse images, while maintaining data privacy, organizations like IWF, which report offensive images online, distribute the hash value of offensive images. In this way, to detect abuse images, service providers can compare the distributed hash value with that of the images uploaded to their servers. If a match is found, the image is downloaded from the server and reported to the authorities. Note, however, that such technology that uses a hash value was created specifically for finding identity between images and is not particularly suited for images of child abuse. Since a hash value is unique to each image, changing one pixel in an image will change its hash value. More specifically, if criminals change a single pixel in the distributed images, it can be difficult to identify the content of the image using the simplistic approach of hash value comparison.

On top of these technologies, there are some improvements, such as perceptual hashing, which is less sensitive to pixel changes. Again however, these technologies have not been designed to detect child abuse images, and therefore, in this domain at least, they suffer from many shortcomings. For example, if the image size changes, the perceptual hash value will also change, so it is very easy to bypass the detection mechanism by simply cropping the image. In addition, using a perceptual hash value may cause many false positives (FPs), which can cause false reports to the authorities, blaming criminal activities on legitimate companies.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
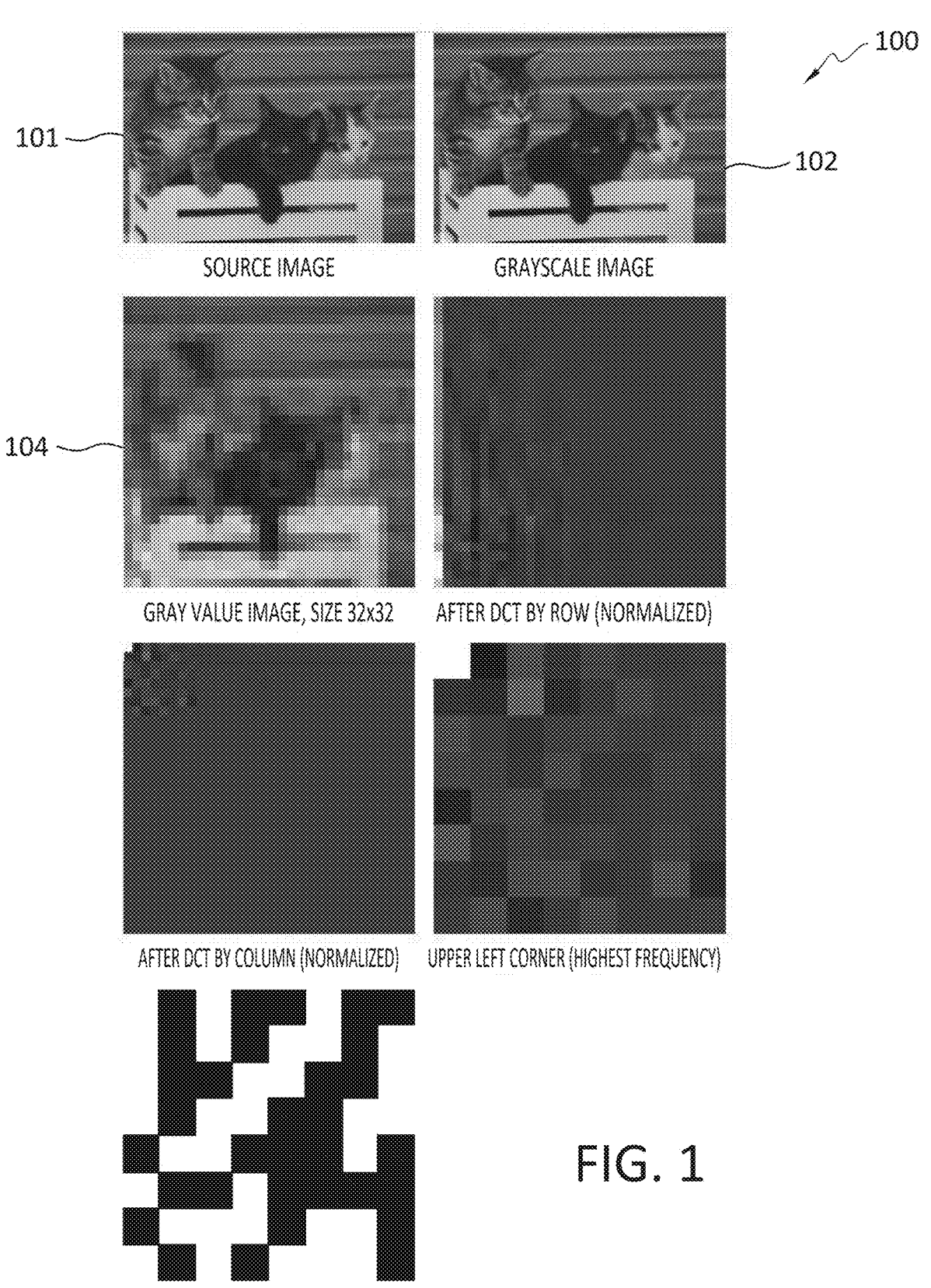
FIG. 1 discloses aspects of an approach for creating a perceptual hashing of an image.

Embodiments of the present invention generally relate to image analysis. More particularly, at least some embodiments of the invention relate to systems, hardware, software, computer-readable media, and methods, for analyzing images to determine whether or not the images are illegal.

One example embodiment comprises a method for determining whether or not an image is illegal, such as an image that comprises illegal content. In a first phase of the example method, frames, such as squares for example, are created around different selected portions of an image. Within a portion, some frames may overlap and some may not. Each of the frames may be assigned a hash value, and may also have a designated reference point, which may have coordinates in an X-Y plane for example, that relates the frame and its position to the other frames in the portion. A list may then be generated that identifies, for each frame, information such as the frame size, hash code, and reference point.

The list may then be provided to an entity, such as a service provider for example. After the image in question has been uploaded to the service provider site, the service provider may then generate frames on the image, using the information in the list, and generate hash values for each frame. These hash values may then be compared with those in the list and if, or when, a specified ratio of hash values is determined, the image may then be classified as illegal. In an embodiment, the ratio is the number of frame matches as a fraction of the total number of frames on the image.

It is noted that, with regard to uploading of the image to the SP server, the algorithm employed by the SP employs hash values to classify an image as illegal, or not. These hash values, without more, do not, and cannot, reveal any private data that may be included in that image. As an example, the GDPR (General Data Protection Regulation) permits the use of such algorithms, that is, algorithms that use hashes, in order to prevent crimes. One example is the algorithms used by banks to prevent money laundering.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that images may be analyzed for illegal content notwithstanding that an attempt may have been made to modify the image so as to prevent detection of the illegal content. An embodiment may preserve privacy by detecting illegal content without actually analyzing the content itself. Various other advantages of one or more example embodiments will be apparent from this disclosure.

A. Overview of Aspects of an Example Embodiment

One example embodiment comprises a method to detect illegal images, such as child abuse images for example, using an approach that is more accurate than current approaches, while maintaining compliance with privacy regulations. One embodiment may comprise a method that includes a first phase, followed by a second phase.

In an embodiment, the first phase may be performed by an organization such as the IWF. In general, such organizations may collect reports on child abuse images. Rather than providing a full image hash code as in a conventional approach however, the organization may create multiple frames on selected areas of the image, such as around the intimate areas and around the face. In a given area, some of the squares may overlap with each other, and others of the squares do not overlap. Note that frames in the shape of squares are provided only by way of example, and the scope of the invention is not limited to any size, or shape, of frame.

The content embraced with the boundary of each of the frames may be hashed to generate a respective hash value corresponding to the frame. Each of the frames in an area may also be assigned a reference point that relates a position of the frame to respective positions of the other frames in that area.

For each image, the organization may generate a list of frames, their size, hash code, and reference point, along with any other necessary metadata. In an embodiment, the list may not include any information of a private nature. Thus, an entity, whether authorized or otherwise, accessing the list would not be able to reconstruct the image, nor identify any person(s) appearing in the image.

In an embodiment, the second phase may be performed at a service provider (SP) site. In general, the service provider may be a contractor, for example, hired by an organization such as the IWF, to perform this phase. In an embodiment, the IWF may perform both the first phase and the second phase.

Figure 4:
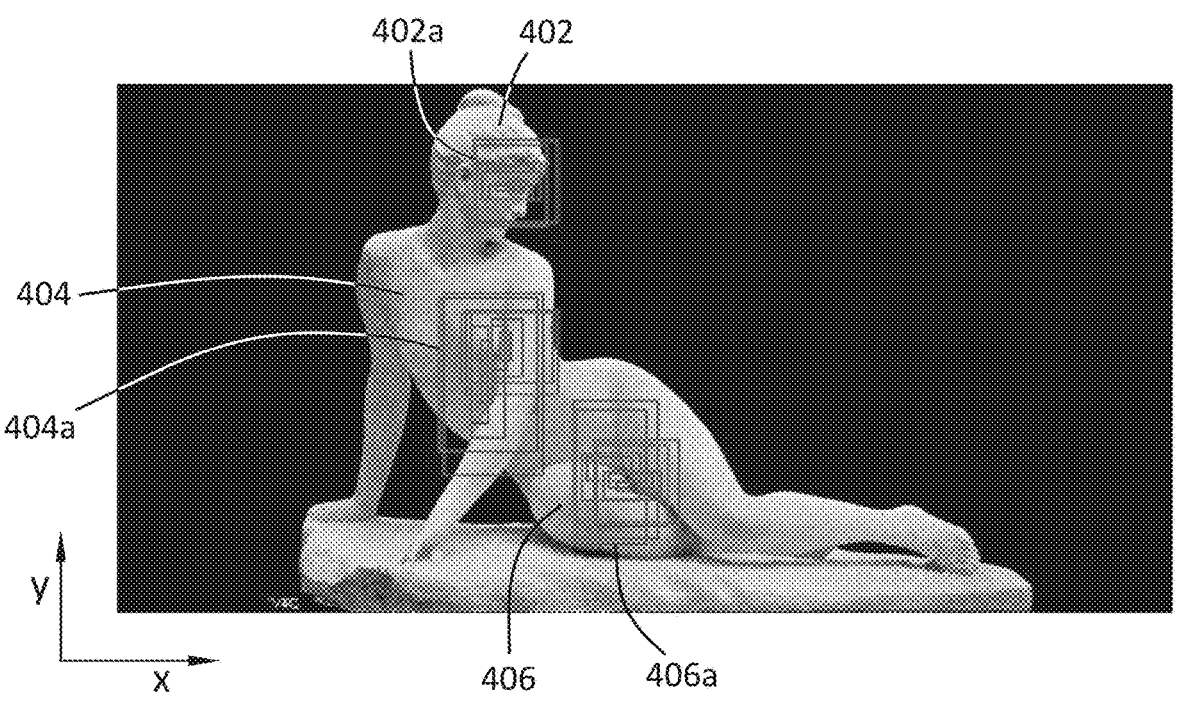
FIG. 4 discloses aspects of an example embodiment for processing a possibly suspect image.

In one implementation of the second phase, the service provider may receive the hash list from an organization such as the IWF. Recall that this list may contain all the details in order to reproduce the squares that were made in the images. Once an image is uploaded to the SP server, the SP server may execute an algorithm to determine if that image is an illegal image. In an embodiment, the algorithm may comprise the following operations:

1. take the first part of image details from the input list—for example, in FIG. 4, there are 3 parts, or areas, that is, 3 groups of squares;
2. on the uploaded image, create frames of the size described in the list and get respective hash values for the content within the defined frames;
3. compare the provided hash values from the list with the hash values (generated at 2.), of the uploaded image;
4. when a hash match is found, create another frame as described in the list details, in a reference location whose coordinates are provided in the list, and obtain, from the list, the hash value corresponding to the created frame;
5. compare the hash value for the created frame (from 4.) with the hash value that was provided for the corresponding frame identified in the list;
6. in case of a match (at 5.), continue with all the frames in the group;
7. in case of a mismatch (at 5.), go to the next area of the image, such as a face for example, and look for a match (operations 2. through 5.); and
8. finish when every portion of the image, detailed in the input list, is analyzed and, if the ratio of matches, that is, the number of hash matches to the total number of frames on the image, is above a given threshold, which may be specified by the input list, the image will be considered to be an illegal image with high accuracy.

As disclosed herein, an example embodiment may possess various useful features and aspects, although no embodiment is required to possess any particular feature or aspect. Following are some examples.

An embodiment may help to ensure accurate identification of a relevant object in the image, and may overcome a possible change of a pixel in the examined area by using several squares. The squares may have areas of overlap between them, and a known distance from a reference point, so as to help ensure confidence in the identification of the subject in the image. Even in case of a manipulation of an image that replaces all of the issue subject background, the detection of this image as illegal may nonetheless remain accurate.

As another example, the detection mechanism employed by an embodiment may be focused only on the object issue in the image. As such, any image manipulation or image cropping of the background that does not damage the object issue will not affect or prevent the detection of the image as illegal.

In a final example, a service provider may not compromise data privacy since the content of the image itself is not analyzed by the service provider, and remains private throughout the whole process. That is, the SP does not run, nor needs to run, any analysis algorithm that would reveal private data, such as an algorithm that recognizes faces, or nudity, for example. In addition, the service provider does not expose the content of the image at any time.

B. Detailed Discussion of Some Aspects of an Example Embodiment

Various data privacy regulations prevent the analysis of end user content unless the end user gives explicit permission to analyze his/her data. Since child abuse images are illegal, the owner of the data embodied by the illegal image is unlikely to ever give permission to analyze the content of the images, since the owner wants to try to avoid being catalogues and identified, and also wants to avoid identification of any persons in the image. Therefore, an embodiment comprises a method that is able to verify and/or identify that a certain image contains illegal content, without analyzing the actual content of the image.

Traditional techniques such as image hashing can be easily circumvented. Hashing is the process of using an algorithm to assign a unique hash value to an image. Duplicate copies of the image all have the exact same hash value. For this reason, a hash is sometimes referred to as a 'digital fingerprint.' Nevertheless, a change to a single pixel in the image will result in a different hash value, and the image will be catalogued as a different image.

B.1 Perceptual Hashing—Comparative Examples

Concomitantly, more advanced image hashing techniques, such as perceptual hashing, may generate significant numbers of false positives (FPs). Most perceptual hash functions, such as the example 100 in FIG. 1, operate by first converting images 101 to a greyscale image 102, and then downscaling the greyscale image 102 to a lower resolution image 104 to speed up overall processing. One of the techniques relies on decomposition of the image into a set of waves using a Fourier related transformation, where the darkness and brightness of pixels in the image are represented by the peaks and valleys of these waves. The hash value can be calculated from the parameters of these waves. In the example of FIG. 1, the hash value is as follows: 10100100101011011001100110110011011000101001000 00111011010101110.

Figures 2, 3:
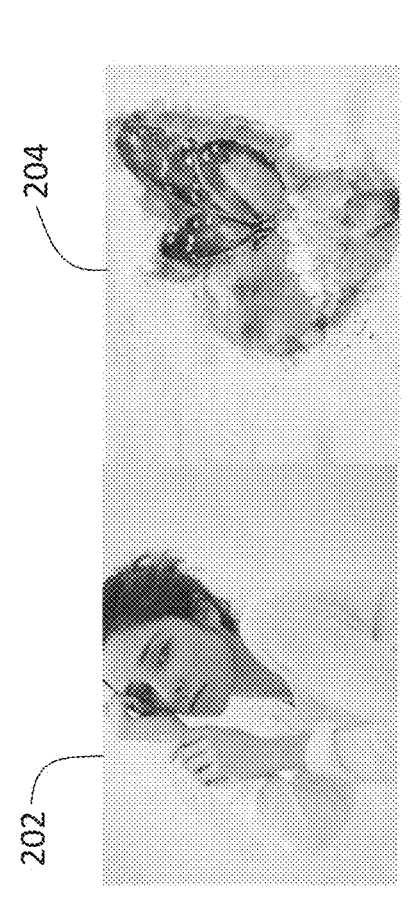
FIG. 2 discloses an example where two different images result in the same perceptual hash.
FIG. 3 discloses a table of image manipulation techniques, and the accuracy of the different perceptual hashing resulting in the same hash code as the image source.

Thus, perceptual hashing assesses the similarity of the images, not the actual content depicted in the images. This characteristic of perceptual hashing causes the images 202 and 204 in FIG. 2, for example, to have the same perceptual hash code, even though the respective image content of the images 202 and 204 is quite different. As this example illustrates, perceptual hashing techniques are not well-suited for evaluating image content.

B.2 Advanced Image Hashing Techniques—Comparative Examples

Advanced image hashing may be performed to evaluate image similarity. Cropping one image creates another image from the original, so conventional algorithms will not detect an approximate match between the two images. Both simple image hashing and advanced image hashing provide a different hash code for a cropped image and the original image, making the cropping operation a simple way to circumvent the detection of child abuse images. The table 300 in FIG. 3 discloses a list of image manipulations that are commonly used by criminals to prevent detection of illegal content. In the table 300, the corresponding accuracy (bottom row) is shown of the different perceptual hashing techniques with respect to the extent to which such techniques may generate the same hash code as the hash of the image source. As indicated there, these techniques are more likely than not to generate different hashes, which may lead to the incorrect conclusion that the cropped and uncropped images are different from each other.

B.3 Example Embodiment

Given the aforementioned comparative examples, attention is directed now to various details of an example embodiment. In contrast with those examples, an embodiment may operate to detect illegal images, such as images depicting child abuse. The feature that differentiates child abuse images from other images is that the main object of the image is a child, and in most of the cases includes explicit nudity. Thus, if the criminal alters the image to avoid detection, most likely the main object will not be altered. Alterations will likely be in the background, or the image will be cropped. As such, the criminal can avoid detection while preserving, in large part, the image. With this in mind, an example embodiment may comprise a method with two different phases.

B.3.1 Example First Phase

In an embodiment, the first phase, or phase one, occurs may be implemented in/by organizations such as the IWF. Those organizations may collect reports on child abuse images and, formerly, would provide the image hash code. In an embodiment, instead of providing the full image hash code, the organization may create, on or in the image, squares or other frames around the intimate areas and around the face, with and without overlap between the squares in each area. Each of the squares will get its own hash value, obtained by hashing the content within the frame, and will also have a reference point to the other squares. For each image, the organization may then provide a list of frames from an image, and, for each frame, a size, hash code, and respective reference points for the other frames.

Thus, and with reference now to the example of FIG. 4, three areas 402, 404, and 406 are indicated. These areas 402, 404, and 406, may be selected on the basis that they correspond, or are suspected to correspond, to illegal content. As further indicated in FIG. 4, multiple frames 402*a*, 404*a*, and 406*a*, may be defined, respectively, for each of the areas 402, 404, and 406. Some of the frames in an area may overlap with each other, and other frames in the area may not overlap. As shown, the frames 402*a*, 404*a*, and 406*a*, may have various shapes, such as square, or rectangular, for example, and may be disposed in an X-Y plane in various positions and orientations. In an embodiment, the frames 402*a*, 404*a*, and 406*a* may be sized and located by a human, while, in another embodiment, an ML (machine learning) model, or other entity, may size and locate the frames 402*a*, 404*a*, and 406*a*. Likewise, a human, or an ML model, or other entity, may determine how many frames should be created.

With continued reference to FIG. 4, and as noted earlier, each of the frames 402*a*, 404*a*, and 406*a* may be assigned a reference point, such as an X-Y plane coordinate for example, that relates the position and orientation of the frame to other frames in the same area. Thus, the reference point for a frame may be used so that the respective positions of each frame can be determined both in the X-Y plane, and with regard to the positions of the other frames. That is, in order to make sure that the initial identification was not random, an embodiment may employ a system of axes, such as 'X' and 'Y,' and a reference point. That is to say, the next rectangle that will help to identify the image will be X pixels in the vertical axis and Y pixels in the horizontal axis relative to the identified point.

B.3.2 Example Second Phase

In an embodiment, the second phase, or phase two, may be performed at a service provider site. The service provider may provide its services to subscribers, such as the IWF. In another embodiment, an entity such as the IWF may perform both the first phase, and the second phase.

In the embodiment currently under consideration, where the service provider performs the second phase, the service provider may obtain the hash list from an organization, such as the IWF. Recall that an embodiment of this list contains all the details needed to reproduce the frames that were made in the images. Once an image is uploaded to the SP server, the SP server may execute an algorithm to determine if the image is illegal, such as an image that depicts child abuse for example. An embodiment of the algorithm may comprise the following operations:

1. take the first part of image details from the input list—for example, in FIG. 4, there are 3 parts, that is, 3 groups of frames;
2. on the uploaded image, make frame cuts of the size described in the list and obtain respective hash values for content in the frames;
3. compare the provided hash values with the hash values of the uploaded image;
4. in case a hash match is found, create another frame as described in the list details, in a reference location that is also provided, and obtain the hash for the content in that frame;
5. compare the newly created hash with the hash that was provided in the list;
6. in case of a match, continue with all the frames in the group, or, in case of a mismatch, go to the next area, such as the face, for example, and look for a match;
7. finish when every part, detailed in the input list, is analyzed-if the ratio of matches, that is, the ration of the number of matches to the total number of frames, is above a given threshold, which may also be provided in the list, the image will be deemed as illegal, and the organization, such as the IWF, notified accordingly.

B.3.3 Definition of the Threshold Used by the Algorithm

In an embodiment, the phase two algorithm may ensure identification of the relevant object in the image, and may overcome the effects of a possible change of a pixel in the examined area by using several frames. The algorithm may also completely ignores the image background, which, in some instances at least, may not be relevant for the identification. However, if the background contains illegal content as well, the algorithm may evaluate the background.

It is possible, maybe likely, that criminals will become familiar with this new algorithm, and then attempt to bypass it. It may thus be assumed, for example, that such bad actors will change some pixels in potential detection areas, in an attempt to prevent the algorithm from classifying an image as illegal. On the other hand, given that criminals will try to maintain the purpose of the image, and not damage it, it may be assumes that they will change only few pixels in order to get different hash values to the proposed squares. However, since the criminals cannot predict the number of squares and their locations, it is likely that some squares will not be affected by these pixel changes.

Further, since the images are known to organizations like IWF, those organizations may, through the employment of a disclosed embodiment, be able to predict what will be the impact of each pixel change in the image. Therefore, with the hash list, the organization may also provide a threshold per image. That is, if the ratio of matches, or the number of matches to the total number of squares, is above such threshold, the image will be deemed to be a child abuse image, with high accuracy and confidence.

Recall that, due to privacy regulations, the service provider cannot see the image and cannot analyze the image content. It is for this reason that, in an embodiment, only authorized organizations such as IWF can specify the threshold. Finally, it is noted that the service provider is not revealing any private data, since the content of the image is not analyzed by the service provider and remains private throughout phase two. In addition, the service provider does not expose the content of the image at any time.

C. Example Method and Architecture

Figure 5:
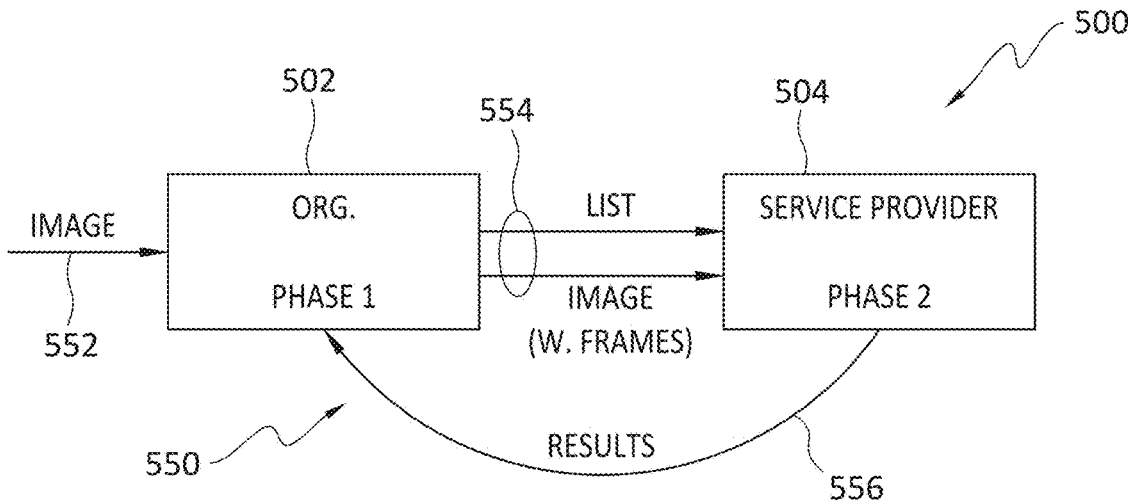
FIG. 5 discloses an example method and architecture according to one embodiment.

With attention now to FIG. 5, and example architecture 500 and associated method 550 are disclosed. As shown, a first entity 502, such as the IWF for example, may communicate with a second entity 504, such as a service provider for example.

Initially, the first entity 502 may receive 552 an image suspected to be illegal. The image may be received from a variety of sources, such as law enforcement, customers, or other source. After receipt 552 of the image, the first entity 502 may perform a first phase, as disclosed herein. The outputs of the first phase may comprise a list, examples of which are disclosed herein, and the image with frames on it. This output may be provided 554 by the first entity 502 to the second entity 504.

Upon receipt of the outputs, the second entity 504 may perform a second phase, as disclosed herein. After completion of the second phase, the second entity 504 may transmit 556 the results of the second phase to the first entity 502. The results may comprise, for example, an assessment that the image received at 552 is, or is not, illegal, that is, contains illegal content.

D. Example Methods

It is noted with respect to the disclosed methods, including the example method of FIG. 5, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: receiving a digital image; receiving an input list that includes a respective hash for each frame in a group of frames; creating new frames on a particular area of the digital image, and the new frames are created and located based on information in the input list; obtaining a respective hash for content included within each of the new frames; comparing one of the hashes generated for one of the new frames with a hash from the input list and, when the hashes match, continue the comparing for all frames of the particular area; and when all hashes from the input list have been checked, determining whether or not the digital image is an illegal image.

Embodiment 2. The method as recited in any preceding embodiment, wherein the input list includes a reference for each of the frames that indicates where, in a coordinate system, the frame is located.

Embodiment 3. The method as recited in any preceding embodiment, wherein the hashes in the input list are each a hash of respective content located within the frames.

Embodiment 4. The method as recited in any preceding embodiment, wherein the creating, the obtaining, and the comparing are performed without accessing any actual content of the digital image.

Embodiment 5. The method as recited in any preceding embodiment, wherein the digital image is deemed to be an illegal image when a ratio of matches meets or exceeds a defined threshold.

Embodiment 6. The method as recited in embodiment 5, wherein the ratio is a ratio of hash matches to a total number of the new frames.

Embodiment 7. The method as recited in any preceding embodiment, wherein when the hash generated for the one new frame does not match the hash from the input list, comparing, with a different hash from the input list, another hash generated for another new frame in a different area of the digital image.

Embodiment 8. The method as recited in any preceding embodiment, wherein one of the new frames overlaps with another of the new frames, and a further new frame does not overlap with any of the new frames.

Embodiment 9. The method as recited in any preceding embodiment, wherein the particular area of the digital image is an area suspected as possibly embracing illegal content.

Embodiment 10. The method as recited in any preceding embodiment, wherein the creating, the obtaining, the comparing, and the determining, are performed so as to maintain privacy of content of the digital image.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
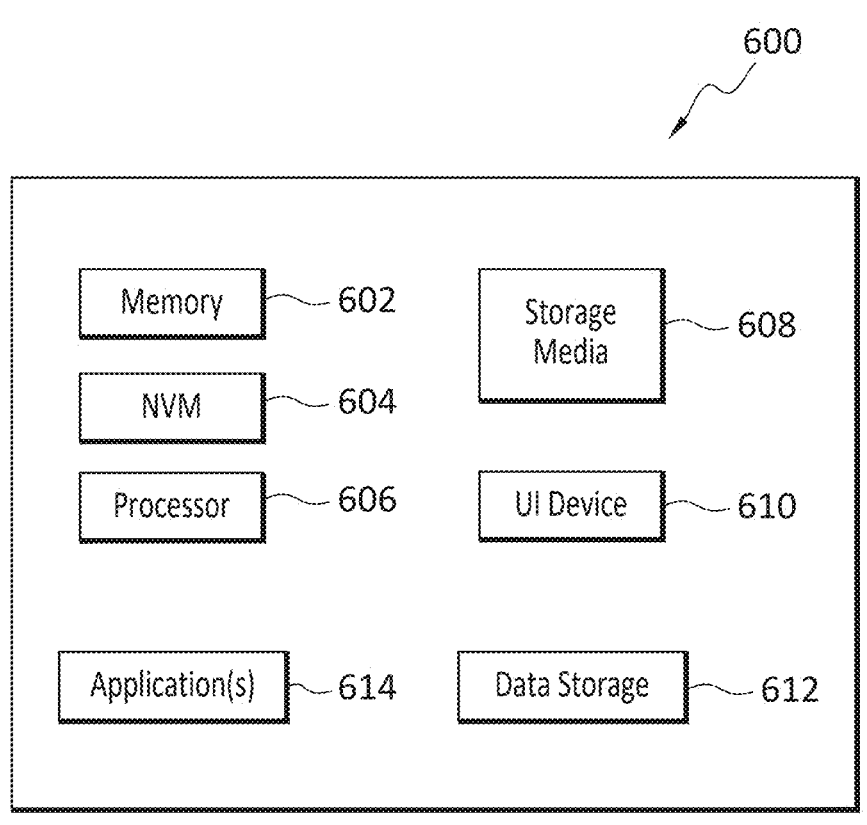
FIG. 6 discloses an example computing entity configured to perform any of the disclosed methods, processes, and operations.

With reference briefly now to FIG. 6, any one or more of the entities disclosed, or implied, by FIGS. 1-5, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a digital image;
receiving an input list that includes a respective hash for each frame in a group of frames;
creating new frames on a particular area of the digital image, and the new frames are created and located based on information in the input list;
obtaining a respective hash for content included within each of the new frames;
comparing one of the hashes generated for one of the new frames with a hash from the input list and, when the hashes match, continue the comparing for all frames of the particular area; and
when all hashes from the input list have been checked, determining whether or not the digital image is an illegal image.

2. The method as recited in claim 1, wherein the input list includes a reference for each of the frames that indicates where, in a coordinate system, the frame is located.

3. The method as recited in claim 1, wherein the hashes in the input list are each a hash of respective content located within the frames.

4. The method as recited in claim 1, wherein the creating, the obtaining, and the comparing are performed without accessing any actual content of the digital image.

5. The method as recited in claim 1, wherein the digital image is deemed to be an illegal image when a ratio of matches meets or exceeds a defined threshold.

6. The method as recited in claim 5, wherein the ratio is a ratio of hash matches to a total number of the new frames.

7. The method as recited in claim 1, wherein when the hash generated for the one new frame does not match the hash from the input list, comparing, with a different hash from the input list, another hash generated for another new frame in a different area of the digital image.

8. The method as recited in claim 1, wherein one of the new frames overlaps with another of the new frames, and a further new frame does not overlap with any of the new frames.

9. The method as recited in claim 1, wherein the particular area of the digital image is an area suspected as possibly embracing illegal content.

10. The method as recited in claim 1, wherein the creating, the obtaining, the comparing, and the determining, are performed so as to maintain privacy of content of the digital image.

11. A non-transitory storage medium having stored therein instructions that are executable by one or more hardware processors to perform operations comprising:
receiving a digital image;
receiving an input list that includes a respective hash for each frame in a group of frames;
creating new frames on a particular area of the digital image, and the new frames are created and located based on information in the input list;
obtaining a respective hash for content included within each of the new frames;
comparing one of the hashes generated for one of the new frames with a hash from the input list and, when the hashes match, continue the comparing for all frames of the particular area; and
when all hashes from the input list have been checked, determining whether or not the digital image is an illegal image.

12. The non-transitory storage medium as recited in claim 11, wherein the input list includes a reference for each of the frames that indicates where, in a coordinate system, the frame is located.

13. The non-transitory storage medium as recited in claim 11, wherein the hashes in the input list are each a hash of respective content located within the frames.

14. The non-transitory storage medium as recited in claim 11, wherein the creating, the obtaining, and the comparing are performed without accessing any actual content of the digital image.

15. The non-transitory storage medium as recited in claim 11, wherein the digital image is deemed to be an illegal image when a ratio of matches meets or exceeds a defined threshold.

16. The non-transitory storage medium as recited in claim 15, wherein the ratio is a ratio of hash matches to a total number of the new frames.

17. The non-transitory storage medium as recited in claim 11, wherein when the hash generated for the one new frame does not match the hash from the input list, comparing, with a different hash from the input list, another hash generated for another new frame in a different area of the digital image.

18. The non-transitory storage medium as recited in claim 11, wherein one of the new frames overlaps with another of the new frames, and a further new frame does not overlap with any of the new frames.

19. The non-transitory storage medium as recited in claim 11, wherein the particular area of the digital image is an area suspected as possibly embracing illegal content.

20. The non-transitory storage medium as recited in claim 11, wherein the creating, the obtaining, the comparing, and the determining, are performed so as to maintain privacy of content of the digital image.

\* \* \* \* \*